(12) United States Patent
Ordonez Fernandez (10) Patent No.: US 9,433,900 B2
(45) Date of Patent: Sep. 6, 2016

(54) PROCESS FOR THE PRODUCTION OF HYDRAULIC ENERGY AND PRODUCTION OF POTABLE WATER BY DIRECT OSMOSIS

(71) Applicant: OHL MEDIO AMBIENTE, INIMA, S.A.U., Madrid (ES)

(72) Inventor: Antonio Ordonez Fernandez, Madrid (ES)

(73) Assignee: GS INIMA ENVIRONMENT SA, Madrid (ES)

( * ) Notice: Subject to any disclaimer, the term of this patent is extended or adjusted under 35 U.S.C. 154(b) by 668 days.

(21) Appl. No.: 13/681,740

(22) Filed: Nov. 20, 2012

(65) Prior Publication Data
US 2013/0160435 A1 Jun. 27, 2013

Related U.S. Application Data

(63) Continuation of application No. PCT/ES2011/070218, filed on Mar. 29, 2011.

(30) Foreign Application Priority Data

May 20, 2010 (ES) .................................. 201030753

(51) Int. Cl.
*F15B 7/00* (2006.01)
*B01D 61/00* (2006.01)
(Continued)

(52) U.S. Cl.
CPC ........... *B01D 61/002* (2013.01); *B01D 61/025* (2013.01); *B01D 61/06* (2013.01);
(Continued)

(58) Field of Classification Search
CPC B01D 2313/24; B01D 61/00; B01D 61/002; B01D 61/025; B01D 61/06; B01D 61/58; C02F 1/441; C02F 1/445; C02F 2103/08; F03G 7/005

USPC .................................. 210/321.66; 60/327, 420
See application file for complete search history.

(56) References Cited

U.S. PATENT DOCUMENTS

2006/0144789 A1 7/2006 Cath et al.
2009/0071902 A1* 3/2009 Stover .................. B01D 61/022
210/637

(Continued)

FOREIGN PATENT DOCUMENTS

| EP | 2 135 846 | 12/2009 |
|---|---|---|
| WO | 2008/149324 | 12/2008 |
| WO | 2010/052651 | 5/2010 |

OTHER PUBLICATIONS

International Search Report issued Aug. 8, 2011 in International (PCT) Application No. PCT/ES2011/070218.

(Continued)

*Primary Examiner* — Dirk Bass
(74) *Attorney, Agent, or Firm* — Wenderoth, Lind & Ponack, L.L.P.

(57) ABSTRACT

The present invention relates to a process for the production of hydraulic energy by direct osmosis from two saline solutions having different concentrations made to pass through one or more modules of semipermeable membranes having a double inlet and outlet port, originally designed to execute the process of inverse osmosis, without a requirement to realise any technical modification to said modules of membranes. In this manner, an osmotic potential is produced in the membranes creating a current of solution having a pressure sufficient to produce hydraulic energy. A further object of the present invention is the installation designed to produce hydraulic energy according to the stated procedure and the use thereof, together with a desalination plant and a tertiary waste water treatment plant comprising the installation to produce hydraulic energy.

8 Claims, 7 Drawing Sheets

(51) Int. Cl.
  *B01D 61/02*  (2006.01)
  *B01D 61/06*  (2006.01)
  *B01D 61/58*  (2006.01)
  *C02F 1/44*  (2006.01)
  *F03G 7/00*  (2006.01)
  *C02F 103/08*  (2006.01)

(52) U.S. Cl.
  CPC .............. *B01D 61/58* (2013.01); *C02F 1/441* (2013.01); *C02F 1/445* (2013.01); *F03G 7/005* (2013.01); *F15B 7/00* (2013.01); *B01D 61/00* (2013.01); *B01D 2313/24* (2013.01); *C02F 2103/08* (2013.01)

(56) References Cited

U.S. PATENT DOCUMENTS

2010/0212319 A1    8/2010  Donovan
2010/0294718 A1   11/2010  Treyvaud

OTHER PUBLICATIONS

International Preliminary Report on Patentability issued Aug. 8, 2011 in International (PCT) Application No. PCT/ES2011/070218 (English translation).

\* cited by examiner

PROCESS FOR THE PRODUCTION OF HYDRAULIC ENERGY AND PRODUCTION OF POTABLE WATER BY DIRECT OSMOSIS

TECHNICAL FIELD OF THE INVENTION

The present invention is framed within the field of water treatment, such as desalination or depuration, and the use of said processes to produce energy, specifically, hydroelectric energy, from the direct osmosis process used in the treatment of saline water and urban waste water.

STATE OF THE ART

Since the beginning of the development of seawater and saline water desalination systems, the energy consumption invested in the production of desalinated water (which nowadays represents between 45% and 55% of the total cost of production), constitutes one of the parameters with the most influence in the application of these technologies. At present, it is expected that the reduction of energy consumption in the desalination process will come from new achievements in the design and manufacturing of semipermeable membranes with greater permeability constants (permeate flow per unit of pressure and area), since the rest of the systems of desalination facilities are reaching efficiency levels close to the technical limits.

As an alternative, the energy potential that could be contributed by direct osmosis for the generation of electric energy has been known theoretically for some time. However, in order to materialize these ideas from a technical standpoint, there are two key conditions to keep in mind: the sources providing the concentrated saline water and the diluted saline water and the physical configuration of the semipermeable membranes used in said process.

The first objective of the present invention consists in increasing the energetic efficiency of the water treatment process by means of direct osmosis.

On the other hand, until now, the production of potable water by means of desalination has been considered a separate process from the subsequent depuration treatment of this potable water after being used, without taking advantage of the synergy of these two fundamental processes of the water cycle. In that sense, even though the use of regenerated water by means of different treatments (decanting, sand filtration, etc.) for direct and indirect human consumption is already well known, some of the most relevant examples referenced in the technical literature being the direct use of water for human consumption in Goreangab (Namibia); the refilling of Tegel Lake (Berlin) by means of water from the tertiary treatment of a depuration plant, and supplying the city by means of perimeter wells in the contour of the lake; refilling of potable water supply aquifers in Los Angeles ("Whittier Narrows Groundwater"), El Paso (Tex.; "Fred Hervey Water Reclamation Plant"), California ("Water Factory 21, Orange County District) and Sulaibiya (Kuwait: also for irrigation of crops and industrial use); and the refilling of the "Occoquan Reservoir" for the supply of potable water in Fairfax County (Virginia), the use of regenerated water through the direct osmosis process for human consumption has not been reported to date.

In short, in its preferred embodiment, the present invention intends to not only take advantage of the direct osmosis process form an energy standpoint, but also to achieve an increase in the production of potable water by means of the integration of the desalination and depuration (reuse) processes through said osmosis with the same pre-treatment infrastructure, as well as an important reduction in production costs (energy consumption, consumption of reagents, replacement of filter cartridges and equipment maintenance costs) and in the investment in the system as a whole. In addition, thanks to the process described herein, the amount of polluting water spillages resulting from desalination, as well as its potential effects on the marine ecosystem, is reduced, with the consequent environmental benefits.

In order to know the energetic potential of a direct osmosis process, the potential osmotic energy in a specific saline solution must be first analysed, as defined by the Van't Hoff Law (1886), related to transport through semipermeable membranes:

$$\pi = k^* c^* R^* T, \text{ where} \quad (1)$$

$\pi$ is the osmotic pressure of the solution in question; c is the concentration of the solution; k is the constant depending on the solute type; R is the constant of the ideal gas law; and T the temperature of the solution.

Taking into account this equation (1), it can be known the law pertaining to the flow path through a semipermeable membrane when two solutions having different saline concentration are compared:

$$Q_{H2O} = Kp^* A^* (\pi - \Delta P), \text{ where} \quad (2)$$

Kp is the permeability of the membrane (depending on the type of membrane), A is the area of the membrane exposed to the flow, $\pi$ is the osmotic pressure given by the Van't Hoff Law and $\Delta P$ is the differential external pressure applied to the membrane. This flow path through the membrane would be the phenomenon that would allow obtaining energy in the process, and depends, as indicated above, both on the saline solutions participating in the process as well as on the configuration of the osmosis membranes.

The greatest problem to achieve the energetic transformation from the natural or direct osmosis process is that no membranes have been developed to carry out this process to date, and the broadly used modules of membranes for inverse osmosis, which are spirally wound membranes, cannot be used for direct osmosis due to their physical and geometrical configuration because they do not meet the two essential requirements to carry out the process:

the module must have two independent inlets, one for the concentrated solution and the other for the diluted solution, and also two independent outlets, one for the concentrated solution and the other for the diluted solution, there should not be direct contact between the concentrated and the diluted solutions, and these solutions must be separated at all times, from the entry into the module until the exit from the module by means of the osmosis membranes, except, as is logical, in the flow distribution devices of the inlet and the flow collection devices of the outlet of the module.

Specifically, there are several factors that make their use impossible for direct osmosis purposes:

there is only one permeate collection channel, and due to the hydraulic geometric configuration, only a small part of the water flow (diluted—brackish water—or concentrated—brine) pumped through this channel will be in contact with the osmosis membrane: the rest of the flow will pass from one side of the permeate channel to the other without making the solutions enter into contact with each other, with which the performance of the system would be negligible and impracticable. The permeated channel acts as a hydraulic "bypass";

it is impossible to evacuate the concentrated brackish water of the membranes (due to the geometric and hydraulic configuration of the membranes themselves), with which the process is not sustainable. That is to say, salts would accumulate on one side of the membrane in a short amount of time (there is no possible exit for the evacuation of the concentrated brackish water solution) until its precipitation and full blockage thereof.

In order to solve these technical deficiencies and to reach the energetic, economic and environmental objectives proposed, a procedure (and an installation conditioned for its achievement) has been developed, based on the direct osmosis phenomenon through semipermeable membranes, preferably made from hollow fibre, which have the peculiarity of being designed and being commonly used to carry out inverse osmosis, integrated in one module with a double inlet and outlet port for the solutions. If the direct osmosis process in question is also carried out, using a concentrated saline solution coming from an inverse osmosis unit of a conventional desalination plant, for example, a seawater desalination plant, and a diluted saline solution coming from the tertiary treatment of a conventional depuration plant as sources of origin, the production of hydraulic energy is obtained, as well as a potential spillage with lower salinity than seawater, enabling the first to be directly poured on the second in clearly favourable conditions from an economic and environmental standpoint. Even more preferably, the potential spillage can pass through a new inverse osmosis unit of a desalination plant once again, which recovers the water from the current which previously passed through the inverse osmosis unit used to carry out the direct osmosis process as product. In this last case, the economic and environmental advantages acquire extraordinary relevance.

DESCRIPTION OF THE INVENTION

The present invention relates to a process for the production of hydraulic energy by direct osmosis from two saline solutions having different concentrations made to pass through one or more modules of semipermeable membranes having a double inlet and outlet port, originally designed to execute the process of inverse osmosis, without a requirement to realise any technical modification to said modules of membranes. The direct osmosis process is obtained because the brackish water is introduced through one of the permeate ports (where the permeated water from the inverse osmosis process normally comes out), and from the other permeate port (where also de water from the inverse osmosis process comes out), concentrated brackish water is in reality extracted; the brine flow is the same than in the inverse osmosis module. Therefore, an osmotic potential is produced in the membranes, creating a current of solution having a pressure sufficient to produce hydraulic energy.

If the sources of both solutions are, on the one hand, the brine spillages originating from conventional desalination plants, for example seawater desalination plants, and on the other, the brackish water originating from tertiary treatment depuration plants, also conventional, then the economic and ecologic benefits of the process increase significantly.

In addition to the process for the production of energy, a further object of the present invention is the installation designed for the stated procedure and the use thereof, together with a desalination plant and a tertiary waste water treatment plant comprising the installation to produce hydraulic energy.

Specifically, the present invention describes a production process for hydraulic energy by direct osmosis from two saline solutions with different concentration, a first concentrated solution and a second diluted solution, characterized in that:

the concentrated saline solution is brine, with a degree of salinity comprised between 5 and 100 g/l, and the diluted saline solution is brackish water with a degree of salinity comprised between 0 and 50 g/l, and always below the degree of salinity of the brine;

the direct osmosis is carried out in at least one module of inverse osmosis semipermeable membranes, which comprises: a casing or enclosure; two separate supply inlets for the solutions inside the module, a first supply inlet for the brine and a second supply intake for the brackish water; two separate outlets for two flows generated inside the module by means of direct osmosis, a first outlet for a diluted brine flow, and a second outlet for a concentrated brackish water flow; and semipermeable membranes separating the two solutions from their entry into the module until their exit thereof;

the process comprising the following steps:

a) pumping a brine flow to the first supply inlet of the module at a pressure $P_1$, lower than the osmotic pressure difference between the osmotic pressure of the brine and the osmotic pressure of the brackish water;

b) pumping a brackish water flow to the second supply inlet of the module at the same time at a pressure $P_2$, sufficient to overcome the load losses through the module of membranes plus a necessary pressure for the final disposal of the concentrated brackish water flow;

c) feeding the brine flow to the interior of the module with the pressure $P_1$ and the brackish water flow with the pressure $P_2$, generating by direct osmosis a water flow path from the brackish water flow to the brine flow through the semipermeable membranes separating both flows, resulting in an independent output flow for diluted brine and an independent output flow for concentrated brackish water;

d) removing the diluted brine flow to the exterior of the module by the first outlet and making said flow pass through a device comprising at least one hydraulic turbine to produce mechanical energy, and e) removing the concentrated brackish water flow by the second outlet of the module.

As it can be observed, in order to differentiate the two solutions intervening in the process by name, the solution always presenting a higher degree of saline concentration is known as "brine", and the most diluted of the two is known as "brackish water", although regarding the common definition given to the term "brackish water", the former can achieve a degree of salinity of up to 50 g/l. That is to say, in some cases, the most diluted solution can even be seawater. The larger the difference between the saline concentrations of the two solutions implicated, the greater the water flow path created by the direct osmosis will be, from the most diluted to the most concentrated, and therefore, the greater the hydraulic energy generated in the process.

Likewise, the two output flows of the module are known as "diluted brine" and "concentrated brackish water", thus attempting to illustrate the effect of direct osmosis on both input solutions, by means of which the brine decreases its salt concentration regarding the initial flow and the brackish water increases its own as a result of the osmotic path flow produced at the membranes. That is to say, the terms "concentrated" and "diluted" are not intended to define a specific degree of salinity for the outlet solutions (which, in reality, will vary in each case depending on initial salinity, and may be calculated by means of the formula (1) and the mass balance established in the module of inverse osmosis), but a change in the relative state arising when comparing the initial saline concentration prior to the entry into the module and the final saline concentration after being subjected to direct osmosis. Since the at least one module has a double inlet and outlet port, the two supply flows never enter into contact inside or outside thereof, only through the semipermeable membranes.

Preferably, the brine comes from a conventional water desalination plant (by evaporation, thermal, electrodialysis, etc.), and more preferably, from a desalination plant by inverse osmosis, and even more preferably, from a seawater desalination plant. On the other hand, the brackish water can come from rivers, lakes, lagoons, streams or effluents from depuration plants and waste water treatment plants, previously conditioned for the direct osmosis process to be carried out. Preferably, the brackish water is an effluent from a tertiary waste water treatment plant, for example, a depuration plant.

Regarding the semipermeable membranes, they are preferably hollow fibre membranes. In a preferred case, the module of membranes also has at least one of the following characteristics:
  product flow (permeate): higher than or equal to 30 m$^3$/D;
  salt rejection: higher than or equal to 99%;
  maximum pressure in working conditions: higher than or equal to 3 MPa;
  temperature range in working conditions: between 5° C.-40° C.;
  brine flow in working conditions: higher than or equal to 20 m$^3$/D;

In an even more preferred application case, the module of the hollow fibre semipermeable membranes with a double inlet and outlet port used would be the one having the following characteristics:
  product flow (permeate): 34 m$^3$/D;
  minimum product flow (permeate): 32 m$^3$/D;
  salt rejection: 99.6%;
  minimum salt rejection: 99.4%
  maximum pressure in working conditions: 8.23 MPa;
  temperature range in working conditions: between 5° C.-40° C.;
  brine flow in working conditions: higher than or equal to 25-120 m$^3$/D;
  such as, for example, the module of membranes manufactured by TOYOBO, HOLLOSEP®, model HJ9155PI.

In another preferred embodiment, the at least one module of membranes presents a permeability constant equal to or higher than 0.05 m$^3$h/bar, more preferably higher than 0.07 m$^3$h/bar.

The input pressure balance of the solutions in the module is essential to obtain the direct osmosis in the membranes designed to carry out inverse osmosis. If $P_1$ depends on the difference in the osmotic pressures of the two solutions to favour the production of a passage of brackish water through the membrane towards the side of the brine, $P_2$ is equivalent to the load losses of at least one module, determined by the manufacturer, together with the pressure needed to remove the concentrated brackish water flow from the interior of said module and guide it to its final destination. Therefore, this pressure also depends on the physical location of the outfall (distance between the exit from the module and the connecting point of the outfall) and the length thereof at sea.

In a preferred embodiment, pressure $P_1$ is comprised between 10 bars and 50 bars, including both limits, and pressure $P_2$ is comprised between 0.5 bars and 5 bars, including both limits. More preferably, pressure $P_1$ is 25 bars and pressure $P_2$ is 1 bar.

In another preferred embodiment, the hydraulic turbine of the device through which the diluted brine flow passes to produce mechanical energy activates an electric generator coupled to said turbine to produce electric energy. The energy obtained in the process, be it hydraulic, mechanical or electric, can be used to activate the different devices intervening in the process, which will be described below, such as, for example, the hydraulic pumps driving the solutions to the interior of the module, or the hydraulic pumps (for example, high pressure pumps from the facilities from which said concentrated and diluted solutions come from).

In the case the process is desired to be completed at this point, then the concentrated brackish water flow removed from at least one module is mixed with the diluted brine flow that has previously passed through the device comprising at least one hydraulic turbine to produce mechanical energy, and is spilled at a discharge point or emitter (deep well, brine pond, sea . . . ). The mixture of both flows in the present invention shows a degree of salinity that is significantly lower than the degree of salinity of the spillage of a conventional desalination plant that does not incorporate this energy usage process, which supposes a relevant environmental advantage.

If, on the contrary, the process is desired to be continued in order to ensure its optimization, in a preferred embodiment, the diluted brine flow, after passing through the device with at least one hydraulic turbine, it is not mixed with the concentrated brackish water but pumped towards a conventional desalination plant, preferably an osmosis plant, and more preferably, an inverse osmosis plant, and is used as raw water supply flow for said plant. This way, the starter brine, which preferably comes from a desalination plant by inverse osmosis, would pass through two other processes, a direct osmosis process to produce energy and an inverse osmosis process to produce supplementary potable water, with which the chemical and bacteriological quality of this water would comply with the most demanding health legislation related to water for human consumption. In addition, as a result of the desalination process the diluted brine is subject to, a spillage consisting of a brine flow with a degree of salinity that is lower than the spillage of a conventional desalination plant is obtained, and part of the diluted brine is recovered as potable water.

Preferably, this second brine flow channel (or spillage), generated at the desalination plant by inverse osmosis, to which the first diluted brine flow has been pumped, is mixed and spilled at a discharge point (sea, deep well, brine pond . . . ), with the concentrated brackish water flow removed to the exterior of at least one module of membranes.

Another object of the present invention is an installation for the production of hydraulic energy by means of direct osmosis to carry out the process described above, as well as an installation for the production of hydraulic energy by means of direct osmosis from two saline solutions with different concentrations, a first concentrated one, brine, with a degree of salinity comprised between 5 and 100 g/l, and a second diluted one, brackish water, with a degree of salinity comprised between 0 and 50 g/l and always lower than the degree of salinity of the brine, characterized in that it comprises:
  at least one module of inverse osmosis semipermeable membranes comprising a casing or enclosure; two separate supply inlets for the solutions inside the module, a first supply inlet for the brine and a second supply inlet for the brackish water; two separate outlets for two flows generated inside the module by means of direct osmosis, a first outlet for a diluted brine flow, and a second outlet for a concentrated brackish water flow; and semipermeable membranes separating the two solutions from their entry into the module until their exit thereof;

a first hydraulic pump feeding a brine flow at a pressure $P_1$ towards the interior of the at least one module through the first supply inlet thereof, $P_1$ being lower than the osmotic pressure difference between the osmotic pressure of the brine and the osmotic pressure of the brackish water;

a second hydraulic pump feeding a brackish water flow at a pressure $P_2$ towards the interior of the at least one module through the second supply inlet thereof, the pressure $P_2$ being sufficient to overcome the load losses through the module of membranes plus a necessary pressure for the final disposal of the concentrated brackish water; and a device connected to the diluted brine flow outlet of the module, comprising at least one hydraulic turbine producing energy by means of the passage of said flow.

The previous indications for the process for the production of energy are also applicable to the present installation. For example, preferably, the semipermeable membranes are made from hollow fibre in addition to having a double inlet and outlet port. In a preferred case, the module of membranes has at least one of the following characteristics:

product flow (permeate): higher than or equal to 30 m$^3$/D;
salt rejection: higher than or equal to 99%;
maximum pressure in working conditions: higher than or equal to 3 MPa;
temperature range in working conditions: between 5° C.-40° C.;
brine flow in working conditions: higher than or equal to 20 m$^3$/D;

In an even more preferred case of application, the module of the hollow fibre semipermeable membranes with a double inlet and outlet port used would be the one having the following characteristics:

product flow (permeate): 34 m$^3$/D;
minimum product flow (permeate): 32 m$^3$/D;
salt rejection: 99.6%;
minimum salt rejection: 99.4%
maximum pressure in working conditions: 8.23 MPa;
temperature range in working conditions: between 5° C.-40° C.;
brine flow in working conditions: higher than or equal to 25-120 m$^3$/D;

such as, for example, the module of membranes manufactured by TOYOBO, HOLLOSEP®, model HJ9155PI.

Also in a preferred embodiment, the brine pumping pressure $P_1$ is comprised between 10 bars and 50 bars, including both limits, and the pressure $P_2$ is comprised between 0.5 bars and 5 bars, including both limits; more preferably, pressure $P_1$ is 25 bars and pressure $P_2$ is 1 bar. In a particular embodiment, the installation comprises at least 750 modules of inverse osmosis semipermeable membranes; said number of modules is variable and depends on the size of the installation.

The first hydraulic pump is preferably connected to a water desalination plant, from which the brine pumped to the interior the module comes from. More preferably, the desalination plant is a desalination plant by inverse osmosis, even more preferably, a seawater desalination plant. The second hydraulic pump may be connected and extract brackish water from rivers, lakes, lagoons, streams or effluents from depuration plants and waste water treatment plants. Preferably, the second pump is connected to a tertiary waste water treatment plant, such as, for example, a depuration plant.

The device comprising at least one hydraulic turbine comprises in addition an electric generator coupled to said turbine in order to transform the hydraulic/mechanic energy into electric energy. Said energy produced, regardless of type, can be used to activate the different devices of the installation, such as the two hydraulic pumps driving the solutions towards the interior of the module, and even any hydraulic pump (for example, the high pressure pump), comprised in the water desalination plant from which the brine comes from, thus reducing the energy consumption of the system.

In addition, the present installation may comprise a spillage collector common to the two flows generated by direct osmosis, said collector being connected both to the concentrated brackish water outlet and to the outlet of the device comprising at least one hydraulic turbine.

In another preferred embodiment, whose intention is to optimize the use of the installation by reducing the salinity of the spillage generated and producing potable water, the installation comprises a third hydraulic pump, which drives the diluted brine flow after its passage through the device comprising at least one turbine, to the inlet of a water desalination plant by inverse osmosis, where it is used as raw water flow to supply said plant.

The installation can also comprise a spillage collector common to a second brine flow, generated at the inverse osmosis water desalination plant, and the concentrated brackish water flow, said collector being connected both to the concentrated brackish water outlet of at least one direct osmosis module, and to an outlet of the desalination plant by inverse osmosis to which the first diluted brine flow has been previously pumped.

Another object of the present invention is the use of any of the installations described above to produce hydraulic energy.

Likewise, the invention relates to a water desalination plant, on the one hand, and to a tertiary waste water treatment plant, on the other, both characterized in that each one of the comprises any of the installations for the production of hydraulic energy described above.

Among the most relevant advantages of the present process for the production of energy and supplementary potable water of the installations described for said purpose, we have:

the significant reduction (around 15%) of the total energy consumption of the installations implicated in the process, such as the desalination plant supplying the brine, the tertiary waste water treatment plant supplying the brackish water, and the new inverse osmosis plant from which the supplementary potable water is obtained, as well as the reduction of the $CO_2$ footprint in similar proportions. In short, the present invention is framed within the application of technologies fostering sustainable development, both from the economic and environmental standpoint.

The significant reduction of potable water production costs, and therefore, its final sales price to the user in up to 11%.

The total investment cost of the conventional installations can be reduced in about 8% regarding the investment in a desalination plant with an equivalent production, since the increase in water production is carried out without any additional abstraction/pre-treatment infrastructure and using a much smaller outfall infrastructure than conventional plants, with a smaller number of diffusers.

The reduction of the spillage flow in 47% and with a discharge salinity 25% lower regarding the conventional desalination plant with the same production, favouring a reduced impairment of the marine environment thanks to a better dilution of the spillage within the sea, and decreasing the negative impact in the so-called near field.

The drastic reduction of the abstraction flow, of up to 62%, decreasing environmental impact.

In short, the present invention offers a joint comprehensive solution to the water problem in two sectors, such as desalination and depuration.

DESCRIPTION OF THE FIGURES

Therefore, within the installation (I), a sectional schematic view of an inverse osmosis module can be observed, which, for simplification purposes, comprises a single hollow fibre semipermeable membrane, with a double inlet and outlet port for the solutions. By means of the symbol QH2O (and the corresponding arrow), the figure represents the passage of the water flow from the side of the brackish water of the membrane to the side of the brine by means of the direct osmosis phenomenon. The figure includes a flow, mass and energy balance corresponding to the examples of preferred embodiments, accompanied by other relevant parameters of the process.

Specifically, said view is composed by the following elements:

(1) Module of inverse osmosis membranes for the production of hydroelectric energy
(2) Semipermeable membrane
(3) Casing
(4) Brine supply inlet to the module
(5) Brackish water supply inlet to the module
(6) Diluted brine outlet to the exterior of the module
(7) Concentrated brackish water outlet to the exterior of the module
(8) Hydraulic brine supply pump
(9) Hydraulic brackish water supply pump
(10) Energy production device
(11) Hydraulic turbine
(12) Outlet of the energy production device (10)

FIG. 2 supplements the flow, mass and energy balance of FIG. 1, which corresponds to the examples of the preferred embodiment, and is accompanied by other relevant parameters of the process.

In this preferred embodiment, both flows, diluted brine and concentrated brackish water, are mixed and spilled at the same discharge point.

The diagram shows the following elements:
(1) Module of inverse osmosis membranes for the production of hydroelectric energy
(2) Semipermeable membrane
(4) Brine supply inlet to the module
(5) Brackish water supply inlet to the module
(6) Diluted brine outlet to the exterior of the module
(7) Concentrated brackish water outlet to the exterior of the module
(8) Hydraulic brine supply pump
(9) Hydraulic brackish water supply pump
(10) Energy production device
(11) Hydraulic turbine
(12) Outlet of the energy production device (10)
(13) Pre-treatment plant of the desalination plant by inverse osmosis
(14) High-pressure pump
(15) Inverse osmosis unit
(16) Pressure exchange system
(17) Hydraulic pump (booster)
(18) Brine outlet
(19) Permeate outlet
(20) Spillage collector

For this reason, FIG. 3 shows the same elements (1) to (19) of FIG. 2, except the common collector (20), and adds a connection from the device (10) with a hydraulic turbine (11) to a hydraulic pump (21) pumping the diluted brine flow to a desalination plant by inverse osmosis (III).

FIG. 4 supplements the flow, energy and mass balance of FIGS. 1 and 3, which correspond to the examples of preferred embodiments, and is accompanied by other relevant parameters of the process.

The diagram in FIG. 4 presents the following elements:
(10) Device comprising at least one hydraulic turbine
(11) Hydraulic turbine
(12) Outlet of the energy production device (10)
(21) Diluted brine flow hydraulic pump
(22) High-pressure pump
(23) Inverse osmosis unit
(24) Pressure exchange system
(25) Hydraulic pump (booster)
(26) Permeate outlet
(27) Brine outlet
(28) Spillage collector FIGS. 5.a, 5.b and 5.c respectively illustrate: a current scenario corresponding to a coastal city with a population of 325,000 (5.a); a preferred application of the installation for the production of hydraulic energy object of protection and the process described for said purpose according to Example 1 in the coastal city (5.*b*); and the application of the installation and procedure according to Example 2 (5.*c*), incorporating a new desalination plant by inverse osmosis to produce water of potable quality. As in the previous figures, FIG. 5.*a*, 5.*b* and 5.*c* show a flow and water salinity balance. Given the scale of the schemes shown, some elements corresponding to FIGS. 1 and 3 have been omitted in order to facilitate their interpretation.

FIG. 5.*a*
  (II) Inverse osmosis water desalination plant
  (18) Brine outlet
  (19) Permeate outlet (potable water)
  (30) Coastal city with a population of 325,000
  (30.1) Waste water flow of the city
  (31) Depuration plant
  (31.1) Depurated water flow to the tertiary treatment plant
  (31.2) Depurated water flow to outfall
  (32) Tertiary waste water treatment plant
  (32.2) Irrigation and rinsing water flow
  (33) Seawater abstraction flow for desalination FIG. 5.*b*
  (I) Installation for the production of electric energy according to FIG. 1
  (4) Brine supply inlet to the module
  (5) Brackish water supply inlet to the module
  (6) Diluted brine outlet to the exterior of the module
  (7) Concentrated brackish water outlet to the exterior of the module
  (9) Hydraulic brackish water supply pump
  (10) Energy production device
  (12) Outlet of the energy production device (10)
  (II) Seawater desalination plant by inverse osmosis
  (18) Brine outlet
  (19) Permeate outlet (potable water)
  (20) Spillage collector
  (30) Coastal city with a population of 325,000
  (30.1) Waste water flow of the city
  (31) Depuration plant
  (31.1) Depurated water flow to the tertiary treatment plant
  (31.2) Depurated water flow to the spillage collector (20)
  (32) Tertiary waste water treatment plant
  (32.1) Brackish water flow
  (32.2) Irrigation and rinsing water flow
  (33) Seawater abstraction flow for desalination FIG. 5.*c*
  (I) Installation for the production of electric energy according to FIG. 1
  (4) Brine supply inlet to the module
  (5) Brackish water supply inlet to the module
  (6) Diluted brine outlet to the exterior of the module
  (7) Concentrated brackish water outlet to the exterior of the module
  (9) Hydraulic brackish water supply pump
  (10) Energy production device
  (II) Seawater desalination plant by inverse osmosis
  (18) Brine outlet
  (19) Permeate outlet (potable water)
  (21) Diluted brine flow hydraulic pump
  (III) Desalination plant by inverse osmosis of the diluted brine flow, coming from the installation for the production of hydraulic energy (I)
  (26) Permeate outlet
  (27) Brine outlet
  (28) Spillage collector
  (30) Coastal city with a population of 325,000
  (30.1) Waste water flow of the city
  (31) Depuration plant
  (31.1) Depurated water flow to the tertiary treatment plant
  (31.2) Depurated water flow to outfall to the spillage collector (20)
  (32) Tertiary waste water treatment plant
  (32.1) Brackish water flow
  (32.2) Irrigation and rinsing water flow
  (33) Seawater abstraction flow for desalination

EXAMPLES OF EMBODIMENT

Next, a series of preferred embodiments of the installation for the production of hydraulic energy and the process in question in scale pilot installation corresponding to FIGS. 1 to 4 are detailed as an example and in an illustrative rather than limitative manner regarding the invention. In addition, an example of an embodiment applied to a coastal urban environment is also included.

Example 1

Process for the production of hydraulic energy by direct osmosis from an installation designed for said purpose, connected to a seawater desalination plant by inverse osmosis as the source of the concentrated solution or brine, and where the two residual flows are jointly spilled at a discharge point. In order to produce hydraulic energy by means of the direct osmosis process, an installation (I) has been designed, as the one shown in FIG. 2, comprising 750 inverse osmosis modules (1) with a double inlet (4,5) and outlet (6,7) port and with hollow fibre semipermeable membranes (2) inside a casing (3), according to the HOLLOSEP® HJ91155PI model, manufactured by TOYOBO, having all the specifications indicated above under the section Description of the Invention, including: a permeability constant higher than 0.07 m³/h/bar, specifically, 0.070062644 m³/h/bar; a salt rejection percentage of 99.6%; a load loss estimated at 0.5 bar for the brackish water flow and at 1 bar for the brine flow inside the module. For simplification purposes, only one module of the 750 of the embodiment is represented.

It starts with a brine flow of 488.9 m³/d with a degree of salinity of 70 g/l and an osmotic pressure of the solution of 57.08 bar, coming from a desalination plant by inverse osmosis (II), and a brackish water flow of 800 m³/d with a degree of salinity of 1.5 g/l and an osmotic pressure of the solution of 1.22 bar coming from a tertiary waste water treatment plant, corresponding to a depuration plant. The desalination plant by inverse osmosis (II) is characterized by the indications given in FIG. 2, where it can be observed that, starting with a pre-treated water flow of 888.9 m³/d with a salinity of 38.5 g/l coming from a seawater pre-treatment plant (13), a brine flow as the one indicated is obtained at one of the outlets (18), and at the other permeate outlet (19), a flow of 400 m³/d with an approximate salinity of 0 g/l. The conversion of a conventional plant of this type is 45%. The brine flow is pumped with a hydraulic pump (8) at a pressure $P_1$ of 25 bars to one of the two supply inlets (4) of the inverse osmosis module (1); on the other hand, the brackish water flow is pumped with a hydraulic pump (9) at a pressure $P_2$ of 1 bar to the other supply inlet (5) of the inverse osmosis module (1). Inside thereof, the passage of a water flow from the side of the brackish water of the semipermeable membrane (2) to the side of the brine takes place, without entering into contact with one another from the entry into the module until the exit thereof. As a consequence of the osmotic pressure difference between the solutions and the pressures with which they have been pumped, an osmotic path flow is generated at the membranes from the brackish water flow to the brine flow due to the process of direct osmosis, equivalent to 664.9 m³/d, After this direct osmosis process inside the module (1), a concentrated brackish water flow of 135.1 m³/d comes out of the module by one of the outlets (7) with a pressure of 0.5 bar and a salinity of 8.87 g/l, and through the other outlet (6) of the module comes out a diluted brine flow of 1,153.8 m³/d at a pressure of 24 bar with a salinity level of 29.66 g/l.

Figure 2:
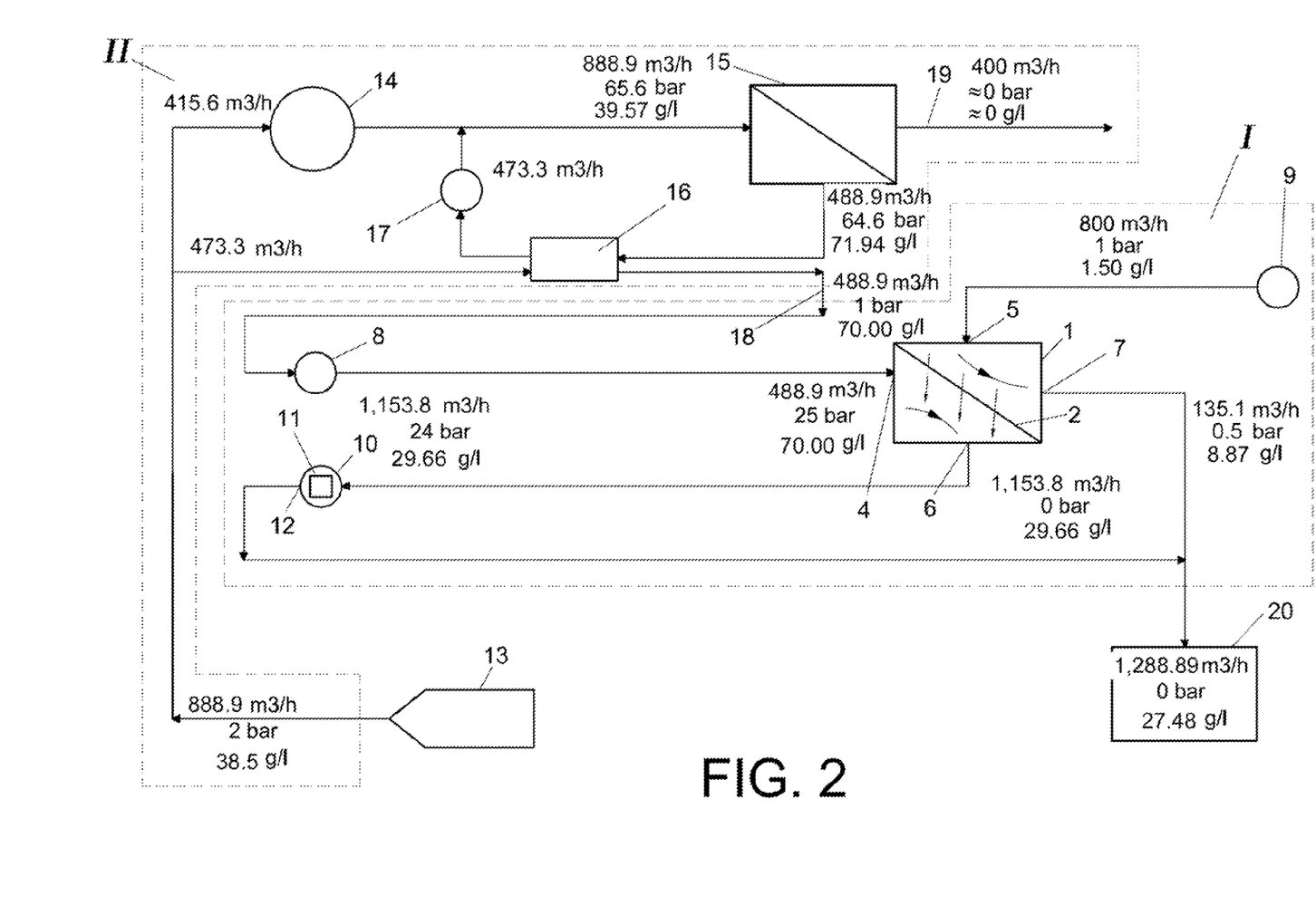
FIG. 2 illustrates a preferred embodiment of the invention, wherein the installation (I) for the production of hydraulic energy is connected to a desalination plant by osmosis (II) as the source of the concentrated solution or brine. The description provided for said desalination plant (II) and the elements composing the same shown in FIG. 2 are merely illustrative of a preferred case, without being limiting thereof.

Said diluted brine flow is taken to a device (10) comprising a hydraulic turbine (11), where energy is produced thanks to the flow pressure; the recovered hydraulic power in the installation is 443 kW, with an energetic usage factor (obtained energy/invested energy) of 2.1, being the specific consumption of the entire installation (desalination plant (II) and installation for the production of energy (I)) of 1.76 kWh/m³. This recovered energy can be used to feed any of the hydraulic pumps (8, 9) with which the flows are pumped at the entry into the module (1), or even the high-pressure pump (14) comprised in the installations of the desalination plant (II) from which the brine flow comes from.

As shown in FIG. 2, after obtaining hydraulic energy, the diluted brine flow, now with a pressure close to 0 bar, comes out of the device (10) by the outlet (12) and is mixed with the concentrated brackish water flow removed from module (1) by the corresponding outlet (7), going towards a spillage collector (20) leading to the sea. The final residual flow is 1,288.89 m³/d, with a salinity of 27.48 g/l, which supposes a larger flow (due to the brackish water from the depuration plant) but with a significantly lower salinity (27.48 g/l vs. 70 g/l) than the one extracted from the desalination plant by inverse osmosis (II), thus reducing the environmental impact of the waste and facilitating the assimilation of the same by the marine environment without affecting the Posidonia meadows; this would allow making the spillages at any point near the coast, with the consequent savings in construction and laying works for marine outfalls.

Example 2

Process as the one described in Example 1, where the diluted brine flow is used as raw water input flow for a desalination plant by inverse osmosis, instead of being spilled to the sea together with the concentrated brackish water flow.

Figure 3:
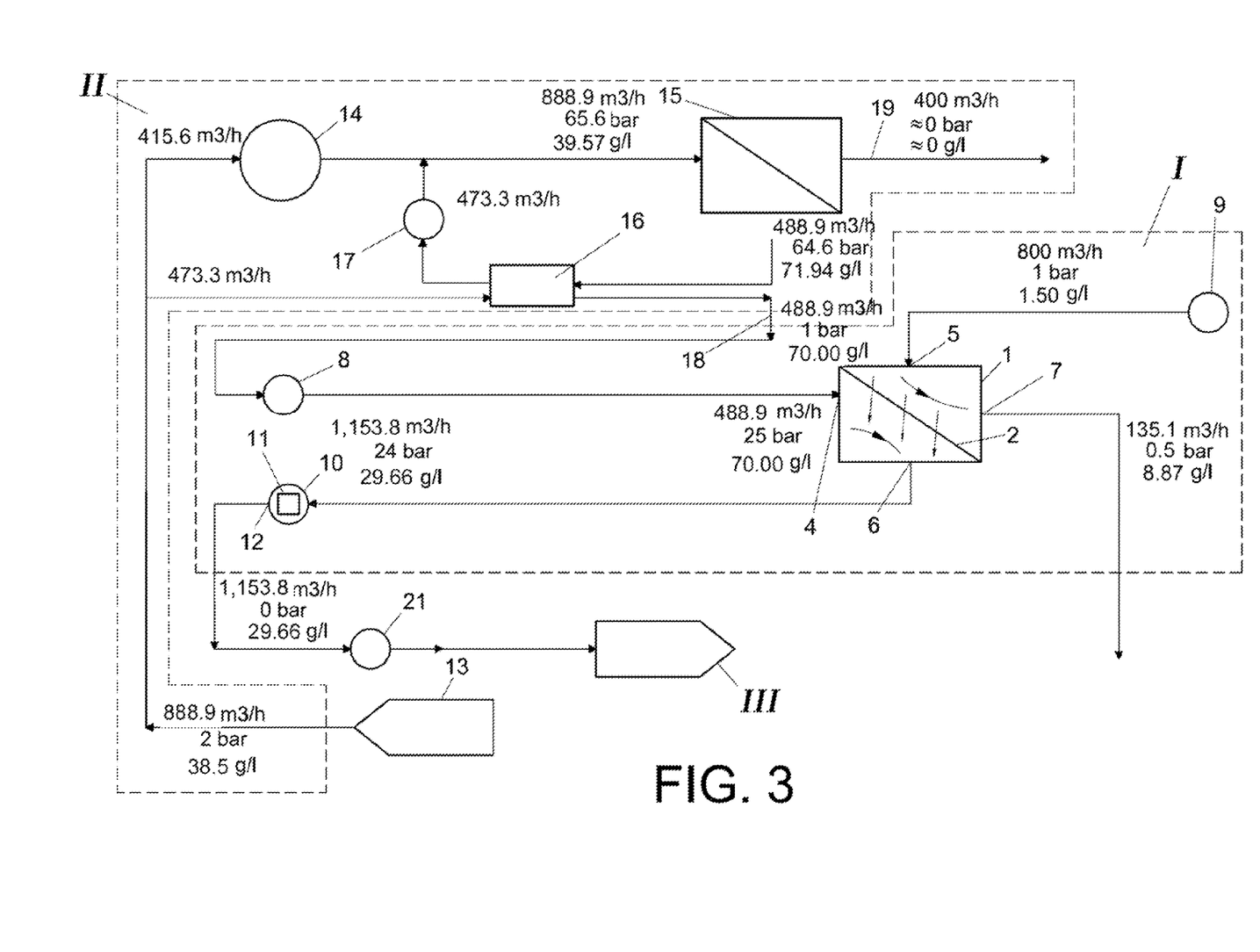
FIG. 3 illustrates another preferred embodiment of the invention, wherein the installation (I) for the production of hydraulic energy is connected to a desalination plant by osmosis (II), wherein the diluted brine flow is not spilled at the discharge point with the concentrated brackish water as in FIG. 2 above, but is pumped to a desalination plant by inverse osmosis (III) as the one shown in FIG. 4, as the supply flow of raw water of said desalination plant to produce potable water.
Figure 4:
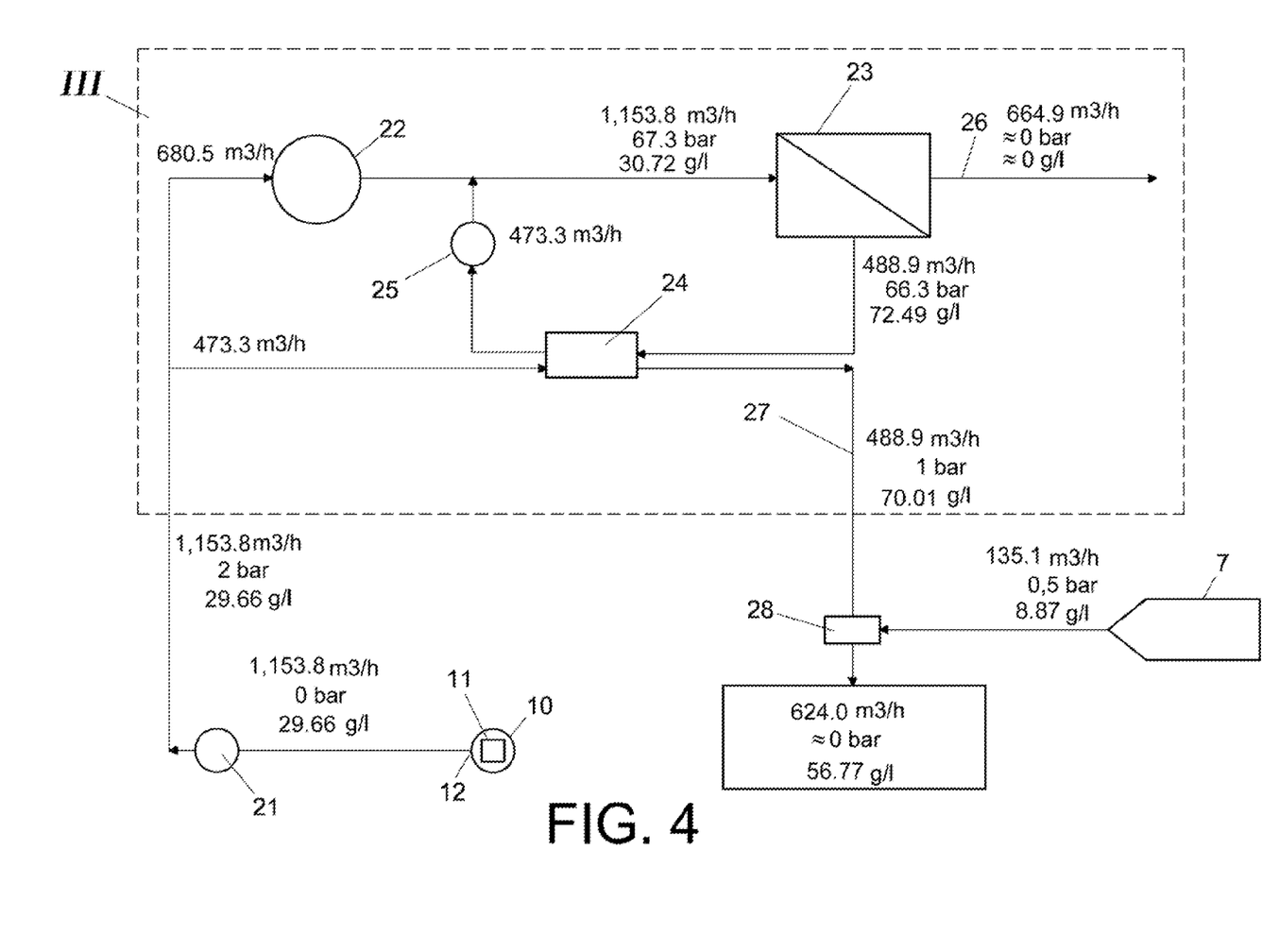
FIG. 4 illustrates the desalination plant by inverse osmosis (III) in detail, wherein the diluted brine flow coming from the device (10) with at least one hydraulic turbine (11) of FIG. 3 is used as the supply flow of raw water of said plant (III). In the specific case being represented, the diluted brine flow is pumped by means of a hydraulic pump (21) to the entry of the desalination plant (III), and after being treated inside the same, it is mixed and spilled in the same collector together with the brackish water flow coming out of the installation (I) for the production of hydraulic energy.
Figure 5A:
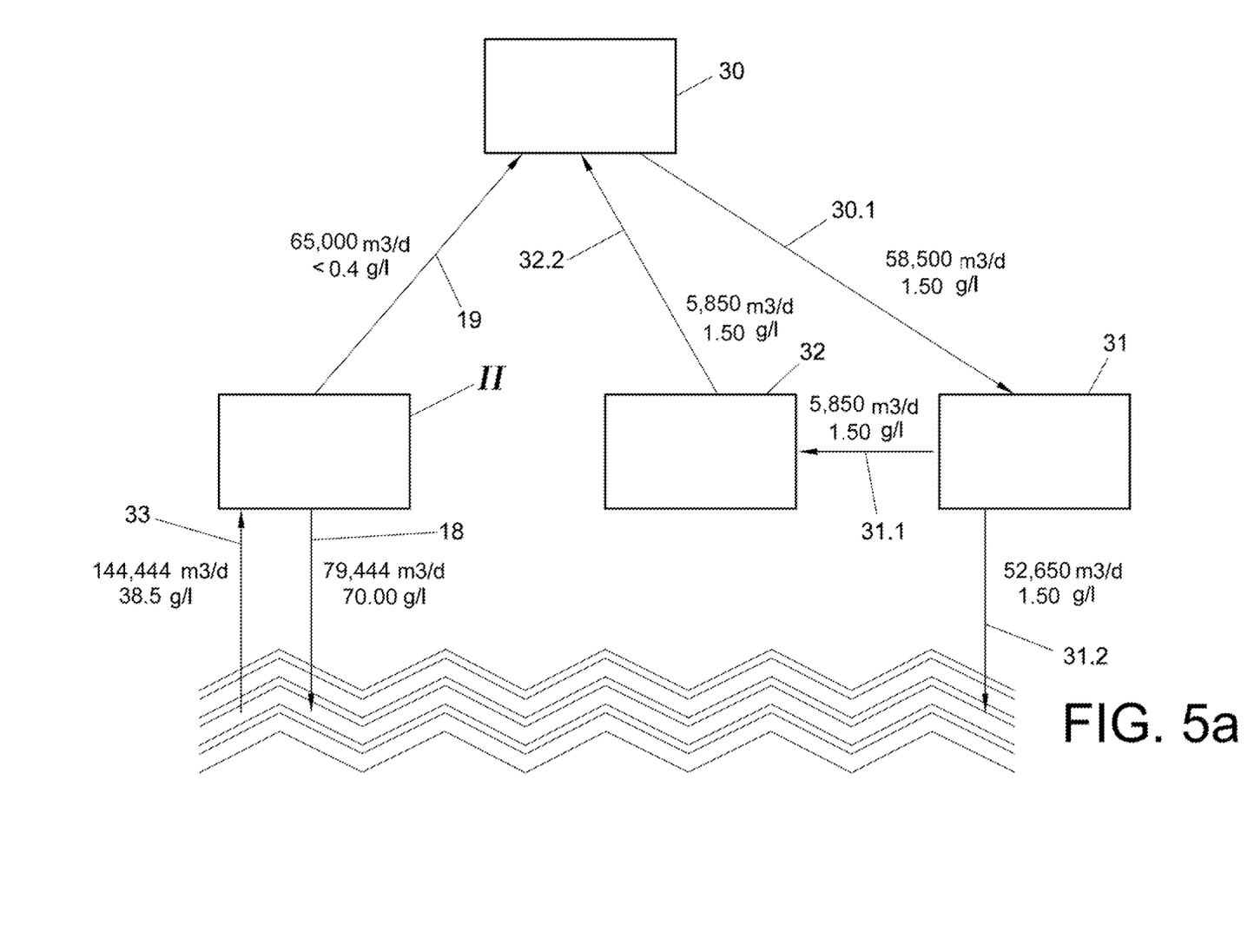
Figure 5B:
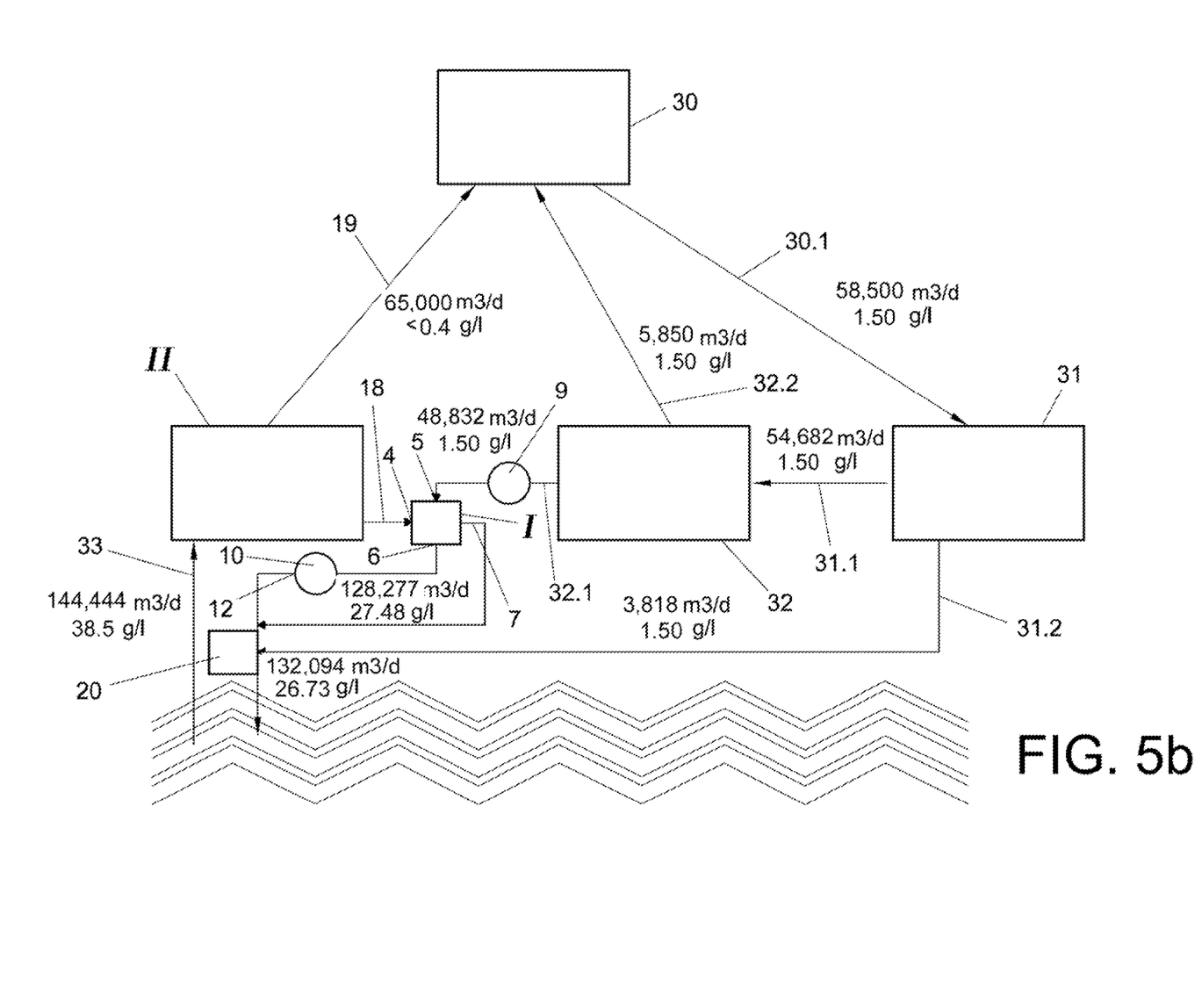
Figure 5C:
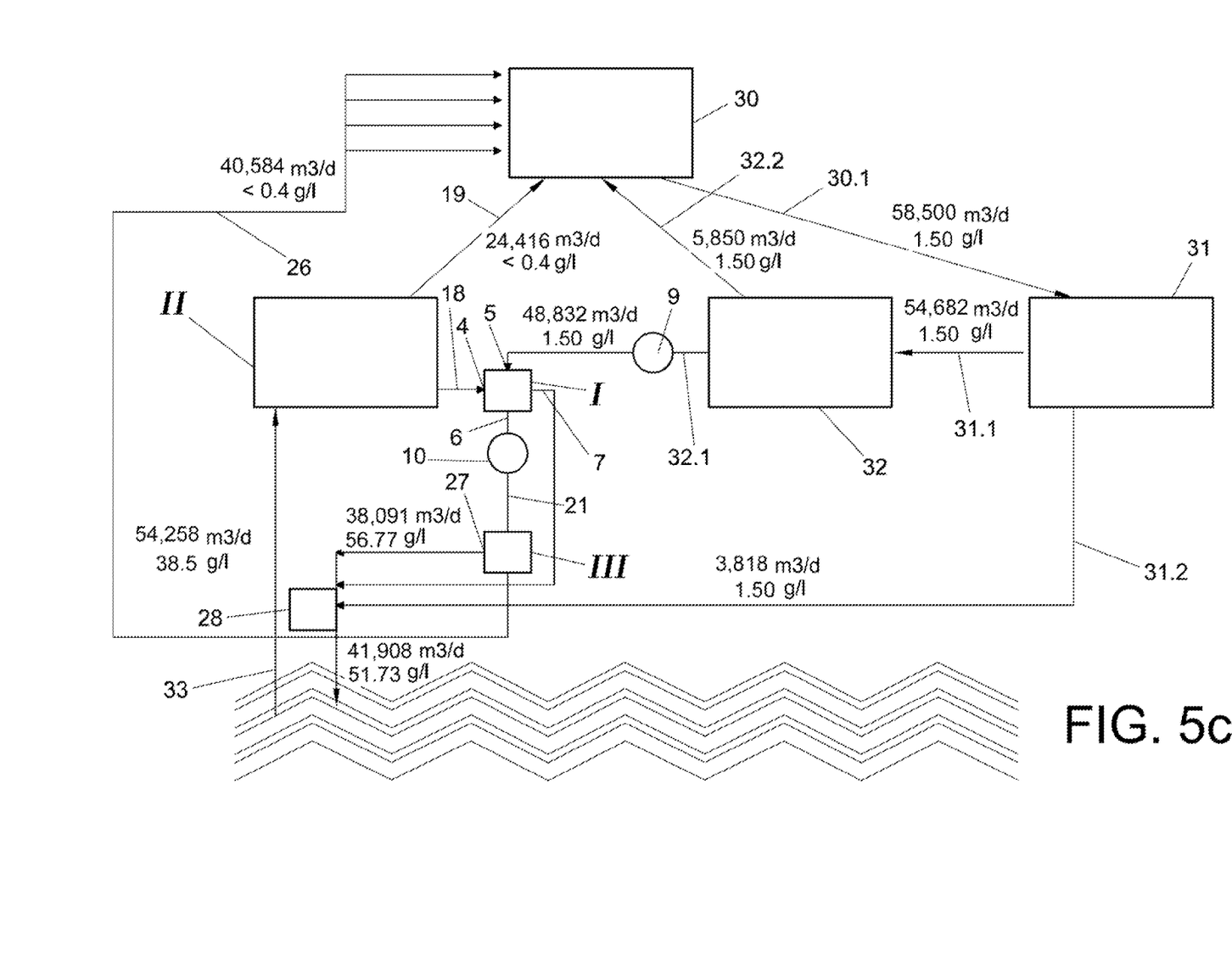

After having passed through the device (10), the diluted brine flow of 1,153.8 m³/d of Example 1 is not mixed with the concentrated brackish water flow, but pumped at 2 bar to a desalination plant by inverse osmosis (III) by means of a hydraulic pump (22), where it will be used as raw water input flow. As an advantage, this raw water flow does not need to be subjected to a pre-treatment prior to the desalination, as is the case in a conventional plant, and does not need to extend the abstraction infrastructure existing at the plant.

Said conventional inverse desalination plant comprises, for example (preferably), a high-pressure pump (22), leading part of the diluted brine flow (680.5 m³/d) to an inverse osmosis unit (23). The rest of the diluted brine flow (473.3 m³/d) is led to a pressure exchange system (24) and is subsequently pumped again with a "Booster" pump (25) to be mixed with the other part of the flow prior to its entry into the inverse osmosis unit (23). This way, a potable water flow of 664.9 m³/d is spilled through the permeate outlet (26) and a brine flow of 488.9 m³/d with a salinity level of 70.01 g/l is spilled through the rejection outlet (27).

This brine flow resulting from the inverse osmosis installation (III) is mixed at the exit with the brackish water flow produced in the modules (1) of the installation for the production of hydraulic energy (I), resulting in a flow of 624.0 m³/d with a salinity of 56.77 g/l, taken to a spillage collector (28) that leads to the sea. The salinity of the final flow is in this case lower than the spillage flow of a conventional desalination plant by inverse osmosis, such as, for example, the one used to supply brine to the installation for the production of energy (II, shown in FIG. 2; 70.00 g/l). In addition, the specific consumption of all the installations considered jointly in this embodiment of FIGS. 3 and 4 is 2.23 kWh/m³, lower than the consumption of a conventional desalination plant by inverse osmosis [approximately 2.44 kWh/m³ for the illustrated case (II)]. The conversion of the second desalination plant (III), to which the diluted brine flow is supplied, is 57.26%, higher than the conventional desalination plant by inverse osmosis from which the brine comes from (II), given that the osmosis plant (III) to which the diluted brine is supplied, begins with a salinity at the entry into the inverse osmosis module of 29.66 g/l, lower than the one at the first plant (II), which is 38.5 g/l.

Example 3

Application of the installation for the production of hydraulic energy object of protection and the process described for said purpose according to Example 1 in a coastal city with a population of 325,000: current scenario (3.*a*), and application of the installation and procedure according to the Examples 1 (3.*b*) and 2 (3.*c*).

3.*a*) Current scenario: a typical coastal city with a population of 325,000 used as a reference, which comprises the following installations:
  a depuration station, supplied with a residual water flow of 58,500 m³/d is supplied, with a degree of salinity of 1.5 g/l, spilling 52,650 m³/d with a degree of salinity of 1.5 g/l after the depuration to the sea, and an effluent of 5,850 m³/d with the same degree of salinity to a tertiary treatment plant;
  a tertiary treatment plant, which produces 5,850 m³/d with a degree of salinity of 1.5 g/l, recovered for irrigation and rinsing; and
  a seawater desalination plant by inverse osmosis, which abstracts 144,444 m³/d as raw water flow with a degree of salinity of 38.5 g/l, producing a brine residue of 79,444 m³/d with a degree of salinity of 70.00 g/l and a permeate flow of 65,000 m³/d with a degree of salinity below 0.4 g/l, used as drinking water.

3.*b*) Application case according to Example 1: in a real application of the present invention, an installation for the production of hydraulic energy (I) by direct osmosis is added to the desalination plant of the coastal city described (II). This way, based on the current scenario and according to the embodiment described in Example 1:
  the initial treatment capacity of the tertiary treatment plant is increased by diverting a larger amount of effluents from the depuration station to said plant: 54,682 m³/d (salinity=1.5 g/l);
  from the tertiary treatment plant a flow of 48,832 m³/d (salinity=1.5 g/l) is diverted by means of channels to the installation for the production of hydraulic energy as the source of brackish water for the direct osmosis process according to Example 1; and
  from the desalination plant (II), the residual brine flow, which used to be spilled at sea (79,444 m³/d, salinity=70.00 g/l), is used as the source of brine for the direct osmosis process according to Example 1.

Finally, the residual flow of the depuration plant (3,818 m³/d, salinity=1.5 g/l) with the diluted brine flow obtained in the hydraulic energy production process object of interest (128,277 m³/d, salinity=27.48 g/l), resulting in a spillage of 132,094 m³/d with a salinity of 26.73 g/l.

Figure 1:
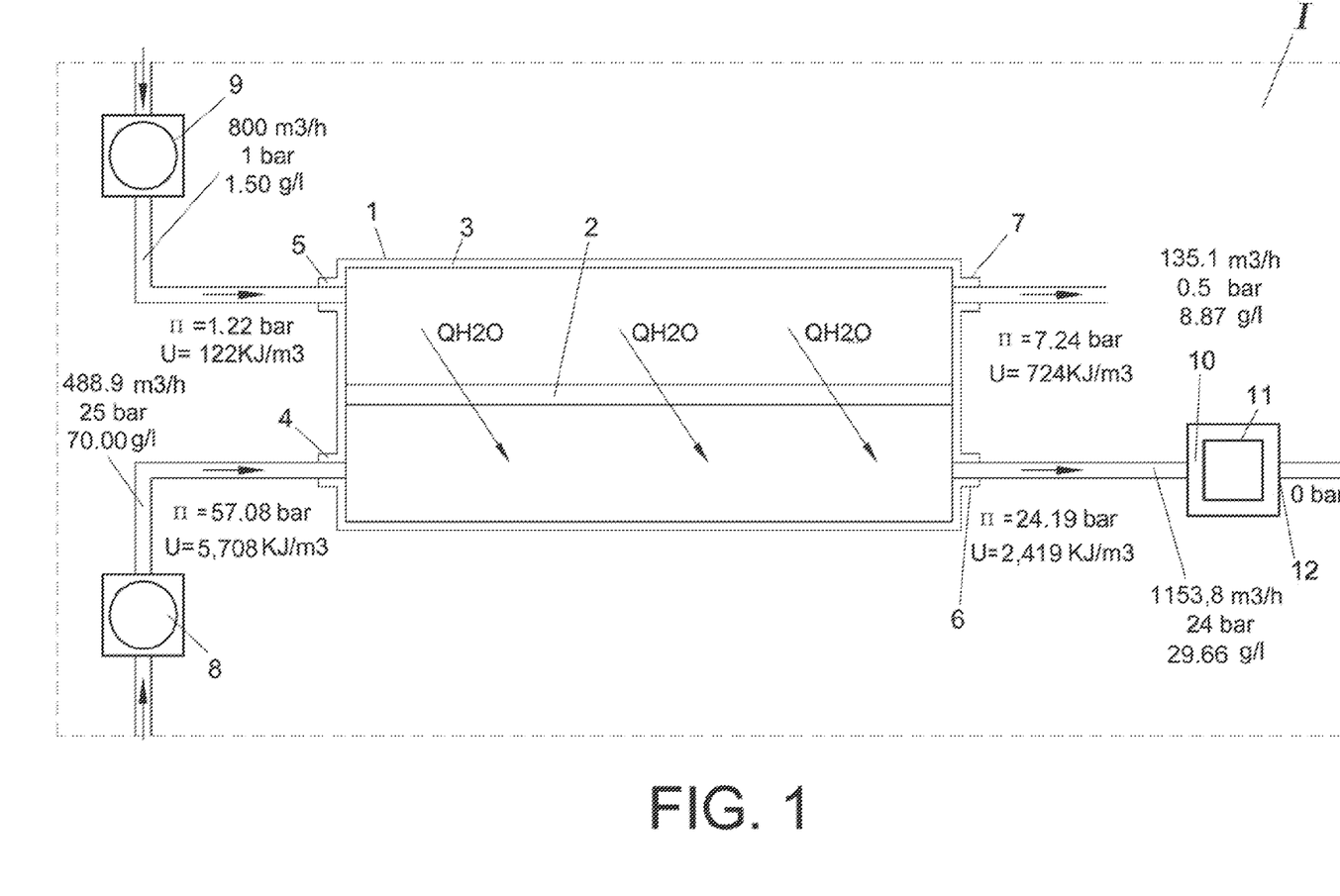
FIG. 1 shows a specific embodiment of the installation for the production of hydroelectric energy by means of inverse osmosis (I) according to the present invention, illustrating the essential elements in a non-limitative manner.

3.c) Application case according to Example 2: in a second, more preferred application of the present invention, an installation for the production of hydraulic energy by means of direct osmosis (I), as the one shown in FIG. 1 and according to Example 2, is added to the desalination plant (II) of the coastal city with a population of 325,000 described in section 3.a), that is to say, wherein the diluted brine flow is not spilled to the sea but used as raw water flow in a new desalination unit by inverse osmosis (Ill). In this embodiment:

the same depurated water flow is diverted to the tertiary treatment plant (54,682 m³/d, salinity=1.5 g/l), and the same flow of said tertiary treatment plant is diverted to the installation for the production of hydraulic energy (I) as the source of brackish water (48,832 m³/d, salinity=1.5 g/l), than in the previous embodiment (3.b), the brackish water flow and the brine flow of the desalination plant by inverse osmosis themselves are used in the energy production process according to Example 1, after which the diluted brine flow obtained in the direct osmosis is used as raw water flow in the new desalination unit by inverse osmosis (III) according to Example 2.

The following is generated from the process described above:

the same treated water flow for irrigation and rinsing purposes than in the previous embodiment: 5,850 m³/d, salinity=1.5 g/l;

a brine flow resulting from the last inverse osmosis process of 38,091 m³/d, salinity=56.77 g/l, which, together with the depurated water spillage described in the previous embodiment 3.b), lead to a spillage at sea of 41,908 m³/d with a salinity of 51.73 g/l;

finally, a potable water flow of 24,416 m³/d, with a salinity below 0.4 g/l is generated from the original desalination plant, as well as a regenerated water flow of 40,584 m³/d with a salinity that is also below 0.4 g/l from the second desalination plant by inverse osmosis, which, due to its excellent quality, is used for refilling reservoirs, refilling aquifers, crop irrigation or direct consumption.

In addition, as a consequence of this process, a smaller seawater flow is abstracted for desalination, from 144,444 m³/d to only 54,258 m³/d, therefore needing an installation that is much smaller than the one required initially.

In this last case is where the advantages of the invention take on the maximum economic and environmental relevance. These advantages have been described elsewhere in this specification. Also with the same relevance, the invention allows extending the potable water production capacity of existing desalination plants in up to 64%, with considerable savings in the investment and operation and maintenance costs, especially regarding energy consumption.

It should also be noted that, if we compare the investment costs of the application of the invention in the coastal city in the three cases, we can conclude that in the case of application (3.b), the total investment costs of the water treatment installations (depuration, tertiary treatment and desalination plants with energy production by direct osmosis) are higher than those corresponding to the current scenario; however, in the application case (3.c), the total investment costs of the water treatment installations (depuration plant, tertiary treatment, desalination plant with energy production by direct osmosis and a new desalination plant for the supplementary production of water) are significantly lower than the current scenario. In these two preferred application cases, the specific energy consumption of the entire water treatment installations would be reduced to 3.80 kWh/m³ in the current scenario, to 3.20 kWh/m³ in the first application case (3.b) and to 3.25 kWh/m³ in the second (3.c).

The invention claimed is:

1. An installation for production of hydraulic energy by direct osmosis from two saline solutions having different concentrations, comprising:

a module of inverse osmosis semipermeable membranes comprising
  a casing,
  two separate supply inlets for the solutions inside the module, the two separate supply inlets including a first supply for brine and a second supply inlet for brackish water,
  two separate outlets for two respective flows generated inside the module by means of direct osmosis, the two separate outlets including a first outlet for a diluted brine flow, and a second outlet for a concentrated brackish water flow, and
  semipermeable membranes separating the two solutions from their entry into the module until their exit thereof,
  wherein the module of inverse osmosis semipermeable membranes are a module of hollow fibre semipermeable membranes with a double inlet and outlet port having the following characteristics
  product flow (permeate): 34 m3/D;
  minimum product flow (permeate): 32 m3/D;
  salt rejection: 99.6%;
  minimum salt rejection: 99.4%
  maximum pressure in working conditions: 8.23 MPa;
  temperature range in working conditions: between 5° C.-40° C.; and
  brine flow in working conditions: higher than or equal to 25-120 m3/D;
a first hydraulic pump feeding a brine flow towards the interior of the module at a pressure $P_1$ through the first supply inlet thereof, $P_1$ being lower than the osmotic pressure difference between the osmotic pressure of the brine and the osmotic pressure of the brackish water;
a second hydraulic pump, connected to a tertiary waste water treatment plant from which the brackish water comes from, feeding said brackish water flow at a pressure $P_2$ towards the interior of the module through the second supply inlet thereof, the pressure $P_2$ being sufficient to overcome load losses through the module of membranes plus a necessary pressure for final disposal of the concentrated brackish water;
a device connected to the diluted brine flow outlet of the module, the device comprising at least one hydraulic turbine producing energy by means of the passage of the diluted brine flow; and
a third hydraulic pump driving the diluted brine flow after its passage through the device comprising the at least one turbine, to an inlet of a water desalination plant by inverse osmosis to produce supplementary water of potable quality.

2. The installation according to claim 1, wherein the module comprises at least 750 modules of semipermeable membranes.

3. The installation according to claim 1, wherein the brine pumping pressure $P_1$ is comprised between 10 bars and 50 bars, including both limits, and the pressure $P_2$ is comprised between 0.5 bars and 5 bars, including both limits.

4. The installation according to claim 1, wherein the pressure $P_1$ is 25 bars, and the brackish water pumping pressure $P_2$ is 1 bar.

5. The installation according to claim 1, wherein the device comprising the at least one hydraulic turbine also comprises an electric generator coupled to said turbine.

6. The installation according to claim 1, wherein the first hydraulic pump is also connected to the water desalination plant, from which the brine comes from.

7. The installation according to claim 1, further comprising a spillage collector common to the concentrated brackish water flow and a second brine flow, is the second brine flow being generated at the water desalination plant by inverse osmosis, said collector being connected to the outlet of the concentrated brackish water of the module and the outlet of the desalination plan by inverse osmosis to which the diluted brine flow is previously pumped.

8. A water desalination plant comprising the installation for the production of hydraulic energy according to claim 1, said installation being connected to the inlet of said desalination plant so the diluted brine flow is driven after its passage through the device comprising the at least one turbine by means of the third hydraulic pump as the raw water supply flow of the plant.

* * * * *